(12) United States Patent
Matthyssen et al.

(10) Patent No.: US 11,865,491 B2
(45) Date of Patent: Jan. 9, 2024

(54) METHOD FOR MANAGING A PRESSURE SWING ADSORPTION GAS TREATMENT UNIT

(71) Applicant: L'Air Liquide, Société Anonyme pour l'Etude et l'Exploitation des Procédés Georges Claude, Paris (FR)

(72) Inventors: Jan Matthyssen, Kapellen (BE); Pascal Meerman, Rotterdam (NL); Luc Nelis, Vorselaar (BE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 245 days.

(21) Appl. No.: 17/344,569

(22) Filed: Jun. 10, 2021

(65) Prior Publication Data
US 2021/0387131 A1   Dec. 16, 2021

(30) Foreign Application Priority Data
Jun. 10, 2020   (FR) ...................................... 2006038

(51) Int. Cl.
*B01D 53/047*   (2006.01)
*C01B 3/50*   (2006.01)

(52) U.S. Cl.
CPC .. *B01D 53/047* (2013.01); *B01D 2259/40003* (2013.01); *B01D 2259/40007* (2013.01);
(Continued)

(58) Field of Classification Search
CPC .................. B01D 53/04; B01D 53/047; B01D 2253/108; B01D 2256/16;
(Continued)

(56) References Cited

U.S. PATENT DOCUMENTS

2012/0174775 A1*  7/2012  Baksh ................. B01D 53/047
                                                                                95/96
2013/0042754 A1*  2/2013  Lomax ............... B01D 53/0446
                                                                                96/116
(Continued)

FOREIGN PATENT DOCUMENTS

AU        2017 245 115        11/2018
EP        3 260 185            12/2017
(Continued)

OTHER PUBLICATIONS

Strahman, S., Strahman valves quick action line blinds solutions for 100% positive pipe & equipment isolation, Aug. 31, 2017, 24 pgs., downloaded from https://www.strahmanvalves.com/images/companies/1/PDF/Strahman%20LB%202018.pdf?1537978238049.
(Continued)

*Primary Examiner* — Frank M Lawrence, Jr.
(74) *Attorney, Agent, or Firm* — Elwood L. Haynes

(57) ABSTRACT

The invention relates to a method for managing a PSA unit having at least N adsorbers arranged in pairs, where each pair is designed to be able to be selectively isolated, a control device, and a plurality of interfaces for accessing the instrumentation of each adsorber. When a first pair is fluidically isolated, the first pair having a first and a second adsorber, the isolating of a third adsorber includes setting the control device to control N-4 adsorbers, fluidically isolating a second pair having the third and a fourth adsorber, isolating one of the first and second adsorbers and the third adsorber, configuring the interfaces so as to swap over the instrumentation of the other of the first and second adsorbers and the instrumentation of the fourth adsorber, placing the first and second pairs in fluidic communication, and setting the control device to control N-2 adsorbers.

5 Claims, 2 Drawing Sheets

(52) U.S. Cl.
CPC ............. *B01D 2259/40043* (2013.01); *B01D 2259/4068* (2013.01)

(58) Field of Classification Search
CPC ........... B01D 2259/40003; B01D 2259/40007; B01D 2259/40043; B01D 2259/4068; Y02C 20/40
USPC ...................................... 96/108, 121; 95/96
See application file for complete search history.

(56) References Cited

U.S. PATENT DOCUMENTS

2014/0373713 A1\* 12/2014 Weist, Jr. ............. B01D 53/047
 95/100
2020/0398212 A1 12/2020 Monereau et al.

FOREIGN PATENT DOCUMENTS

| FR | 2 865 554 | 7/2005 |
| FR | 3 078 635 | 9/2019 |
| WO | WO 2017 153636 | 9/2017 |
| WO | WO 2018 108066 | 6/2018 |

OTHER PUBLICATIONS

French Search Report for corresponding FR 2006038, dated Feb. 1, 2021.

\* cited by examiner

METHOD FOR MANAGING A PRESSURE SWING ADSORPTION GAS TREATMENT UNIT

CROSS REFERENCE TO RELATED APPLICATIONS

This application claims the benefit of priority under 35 U.S.C. § 119 (a) and (b) to French Patent Application No. 2006038, filed Jun. 10, 2020, the entire contents of which are incorporated herein by reference.

BACKGROUND

The present invention relates to a method for managing a unit for treating a gas using Pressure Swing Adsorption (PSA), notably in order to produce an enriched gas stream from a feed gas stream, and more particularly pressure swing adsorption treatment units (PSA units) employing at least 6 adsorbers.

The invention finds a particularly advantageous, although not exclusive, application to H2, O2 or CO2 PSA.

Generally speaking, a gas phase adsorption process can be used to separate one or more molecules of a gas mixture containing said molecules, by utilizing the difference in affinity of one or more adsorbents for the various constituent molecules of the mixture. The affinity of an adsorbent for a molecule depends partly on the structure and composition of the adsorbent and partly on the properties of the molecule, particularly its size, electron structure and multipole moments. An adsorbent can be, for example, a zeolite, an activated carbon, an optionally doped activated alumina, a silica gel, a carbon molecular sieve, an organometallic structure, an alkaline or alkaline-earth metal oxide or hydroxide, or a porous structure preferably containing a substance capable of reversibly reacting with the molecules, such as amines, physical solvents, metal complexing agents, metal oxides or hydroxides, for example.

The most commonly used adsorbent materials are in the form of particles (beads, sticks, crushed materials, etc.), but they can also be found in structured form, such as monoliths, wheels, parallel passage contactors, fabrics, fibres, etc.

There are 3 main families of adsorption processes: sacrificial charge processes, temperature swing adsorption processes referred to as TSA processes and lastly PSA (pressure swing adsorption) processes.

In lost-charge processes, a new charge is introduced when the existing charge is saturated with the impurities, or more generally when it is no longer able to provide adequate protection.

In TSA processes, the adsorbent, at the end of use, is regenerated in situ, that is to say that the impurities captured are discharged in order for said adsorbent to recover the greater part of its adsorption capabilities and to be able to recommence a purification cycle, the main regeneration effect being due to a rise in temperature.

Lastly, in PSA processes, the adsorbent, at the end of the production phase, is regenerated by desorption of the impurities, which is achieved by means of a fall in their partial pressure. This fall in pressure can be achieved by a fall in the total pressure and/or by flushing with a gas devoid of or containing little in the way of impurities.

Pressure swing adsorption processes are used both to eliminate traces of impurities—for example, in levels below one percent in the feed gas—and to separate mixtures containing several tens of percent of different gases. The first case is generally referred to as purification (gas drying, for example) and the second case as separation (producing oxygen or nitrogen from atmospheric air, for example).

In the context of the present invention, the term PSA denotes any process for the purification or separation of gas employing a cyclical variation in the pressure which the adsorbent experiences between a high pressure, referred to as adsorption pressure, and a low pressure, referred to as regeneration pressure. Thus, this generic designation of PSA is employed without distinction to denote the following cyclical processes, to which it is also commonplace to give more specific names, depending on the pressure levels employed or the time necessary for an adsorber to return to its starting point (cycle time):

- VSA processes, in which the adsorption is carried out substantially at atmospheric pressure, preferably between 0.95 and 1.25 bar abs, and the desorption pressure is lower than atmospheric pressure, typically from 50 to 400 mbar abs;
- MPSA or VPSA processes, in which the adsorption is carried out at a high pressure greater than atmospheric pressure, typically between 1.5 and 6 bar abs, and the desorption is carried out at a low pressure lower than atmospheric pressure, generally of between 200 and 600 mbar abs;
- PSA processes proper, in which the high pressure is substantially greater than atmospheric pressure, typically between 3 and 50 bar abs, and the low pressure is substantially equal to or greater than atmospheric pressure, generally between and 9 bar abs;
- RPSA (Rapid PSA) processes, for which the duration of the pressure cycle is typically less than a minute;
- URPSA (Ultra Rapid PSA) processes, for which the duration of the pressure cycle is of the order of a maximum of a few seconds.

It should be noted that these various designations are not standardized and that the limits are subject to variation.

Once again, unless otherwise stated, the use of the term PSA here covers all of these variants.

An adsorber will thus begin a period of adsorption at the high pressure until it is loaded with the constituent or constituents to be captured and will then be regenerated by depressurization and extraction of the adsorbed compounds, before being restored in order to again begin a new adsorption period. The adsorber has then completed a pressure cycle and the very principle of the PSA process is to link these cycles together one after the other; it is thus a cyclical process. The time which an adsorber takes to return to its initial state is known as cycle time. In principle, each adsorber follows the same cycle with a time offset, which is known as phase time or more simply phase. Hence the relationship; phase time=cycle time/number of adsorbers. It may be seen that the number of phases is equal to the number of adsorbers.

This cycle generally comprises periods of:
- Production or Adsorption, during which the feed gas is introduced via one of the ends of the adsorber, the most adsorbable compounds are adsorbed preferentially and the gas enriched in the least adsorbable compounds (product gas) is extracted via the second end. The adsorption can be carried out at an increasing pressure, at a substantially constant pressure or even at a slightly decreasing pressure;
- Depressurization, during which the adsorber, which is no longer fed with feed gas, is discharged via at least one of its ends of a portion of the compounds present in the adsorbent and the free spaces. Taking as reference the direction of circulation of the fluid in the adsorption period, it is possible to define co-current, counter-current or simultaneously co-current and counter-current depressurizations;

Elution or Purge, during which a gas enriched with the least adsorbable constituents (purge gas) circulates through the adsorbent bed in order to help in the desorption of the most adsorbable compounds. Purging is generally performed counter-currently;

Repressurization, during which the adsorber is at least partially repressurized before again starting an Adsorption period. Repressurization can take place counter-currently and/or co-currently;

Dead time, during which the adsorber remains in the same state. These dead times can form an integral part of the cycle, making it possible to synchronize steps between adsorbers, or form part of a step which has finished before the allotted time. The valves can be closed or remain in the same state, depending on the characteristics of the cycle.

Pressure swing adsorption treatment units (PSA units) comprising a number N of adsorbers, N being an even number greater than or equal to 6, for example N=6, 8, 10 or 12, are known. In this type of unit, the adsorbers are arranged in pairs so that it is possible to fluidically isolate the two adsorbers of a pair, when a fault, for example a gas leak, with at least one adsorber of the pair, is detected. This isolation is performed using an isolation valve. When a pair of adsorbers is fluidically isolated, it is then possible to set the unit so that it operates on the basis of N-2 adsorbers. A problem may arise when another adsorber, belonging to another pair, becomes defective. Isolating this other pair entails setting the unit to operate on the basis of N-4 adsorbers. The output of this unit is then greatly reduced. Furthermore, there are at least two adsorbers of the unit, namely one adsorber in each isolated pair, which, although in perfect working order, are taken out of operation. This situation is not ideal.

SUMMARY

The present invention seeks to overcome these disadvantages in an effective way by proposing a method for managing a pressure swing adsorption gas treatment unit, the unit comprising:

at least N adsorbers, N being an even number greater than or equal to 6, the N adsorbers being arranged in pairs,
a plurality of isolation valves for selectively isolating at least one pair with respect to the unit,
a plurality of cycle valves for controlling the pressure cycle of each adsorber,
  each pair being arranged in such a way as to be isolated selectively, so that isolating a pair allows the two adsorbers of the pair to be fluidically isolated with respect to the unit, the isolating of a pair being performed by closing at least one isolation valve,
a control device.
a plurality of interfaces for accessing instrumentation means of each adsorber, characterized in that, when a first pair is fluidically isolated with respect to the unit by the closing of at least one isolation valve, the first pair comprising a first adsorber and a second adsorber, and the control device being configured to control only N-2 adsorbers of the unit,
the isolating of a third adsorber comprises the steps of:
  setting the control device to control only N-4 adsorbers of the unit,
  fluidically isolating a second pair with respect to the unit by closing at least one isolation valve, the second pair comprising the third adsorber and a fourth adsorber,
  fluidically isolating one of the first and second adsorbers so that it is isolated from the unit independently of the fluidic isolation of the pair to which it belongs, notably by installing at least one hermetic plug,
  fluidically isolating the third adsorber so that it is isolated from the unit independently of the fluidic isolation of the pair to which it belongs, notably by installing at least one hermetic plug,
  while the first and second pairs are fluidically isolated from the unit, configuring the interfaces so as to swap over the instrumentation means of the other of the first and second adsorbers and the instrumentation means of the fourth adsorber,
  placing the first and second pairs in fluidic communication with respect to the unit by opening at least one isolation valve,
  setting the control device to control only N-2 adsorbers of the unit.

The invention thus makes it possible to optimize the gas production process of a pressure swing adsorption treatment unit when at least two adsorbers belonging to two distinct pairs are defective.

According to one embodiment, the control device is configured to allow the unit to operate with at least one pair of adsorbers isolated.

According to one embodiment, the method is implemented without shutting down the unit, so that production remains uninterrupted.

According to one embodiment, the cycle valves are distinct from the isolation valves.

According to one embodiment, the unit comprises a fluidic isolation means to allow at least one of the adsorbers to be fluidically isolated with respect to the unit, the fluidic isolation means being distinct from the isolation valve.

According to one embodiment, the isolation means comprise a hermetic plug, such as a blind flange or a ring seal.

According to one embodiment, the method comprises the step of installing a hermetic plug for fluidically isolating one of the first and second adsorbers so that it is isolated from the unit independently of the fluidic isolation of the pair to which it belongs.

According to one embodiment, the method comprises the step of installing a hermetic plug for fluidically isolating the third adsorber so that it is isolated from the unit independently of the fluidic isolation of the pair to which it belongs.

According to one embodiment, the method comprises the step of removing or deactivating a plurality of cycle valves, notably of removing or deactivating the cycle valves facing the hermetic plugs.

According to one embodiment, the method comprises the step of purging one of the first and second adsorbers and the third adsorber.

According to one embodiment, the method comprises the step of inerting one of the first and second adsorbers and the third adsorber.

According to one embodiment, the interfaces comprise cables, notably electric and/or optical cables, connecting the instrumentation means of each adsorber to the control device, the method notably comprising the step of changing over the end of the cables that is connected to the instrumentation means of the other of the first and second adsorber with the end of the cables that is connected to the instrumentation means of the third adsorber.

According to one embodiment, the instrumentation means comprise sensors, notably pressure sensors, and valve switching devices.

According to one embodiment, the unit comprises 12 adsorbers.

According to one embodiment, the unit is designed to produce molecular hydrogen.

BRIEF DESCRIPTION OF THE DRAWINGS

The invention will be understood better from reading the following description and from studying the accompanying figures. These figures are given only by way of illustration and do not in any way limit the invention.

DETAILED DESCRIPTION OF PREFERRED EMBODIMENTS

Figure 1:
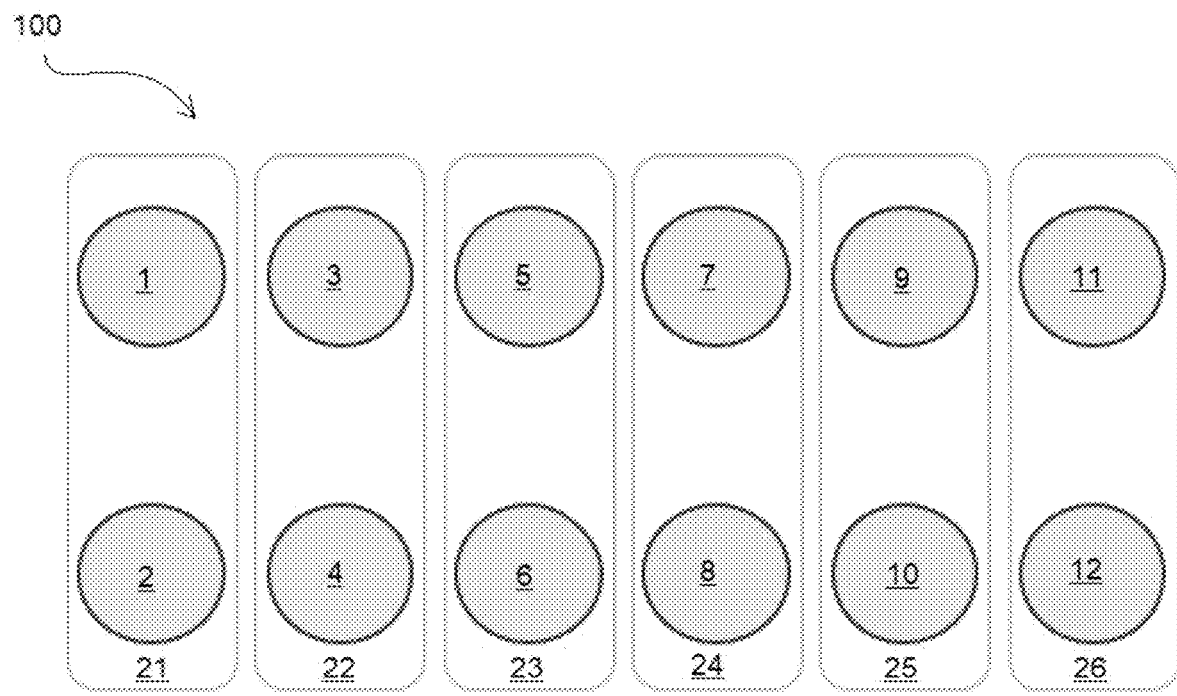
FIG. 1 is a schematic depiction of a PSA unit in which the method according to the invention is implemented.

Reference is made to FIG. 1, which depicts a PSA unit 100 employing 12 adsorbers 1-12. This PSA unit 100 is configured in such a way as to comprise 6 pairs 21-26 of adsorbers (one pair comprising the adsorbers 1 and 2, another pair comprising the adsorbers 3 and 4, etc.). Each pair 21-26 of the PSA unit 100 is designed to be selectively isolated, so that the isolating of a pair allows the two adsorbers of the pair to be fluidically isolated with respect to the unit 100. More specifically, each pair 21-26 can be isolated from the rest of the unit 100 by an isolation valve, not depicted.

Electing to group the adsorbers 1-12 together in pairs 21-26 for isolating at least one adsorber 1-12 of the unit represents a compromise between the operational flexibility and the complexity of the technical installations of the PSA unit 100.

The unit 100 further comprises a plurality of cycle valves and a control device for controlling the cycle valves, in order to carry out the pressure cycle, Each adsorber 1-12 is thus controlled by cycle valves assigned to it.

The unit 100 further comprises a plurality of interfaces for accessing instrumentation means of each adsorber 1-12.

More specifically, these interfaces comprise electric cables, connecting the instrumentation means of each adsorber 1-12 to the control device.

The instrumentation means comprise pressure sensors and cycle valve switching devices.

Thus, the control device is able to read the information delivered by the sensors and control the cycle valves of each adsorber 1-12.

When a fault on one of the adsorbers 1-12 is detected (or indeed in order to carry out a maintenance operation on one of the adsorbers 1-12), it is possible to elect to fluidically isolate one of the pairs 21-26 by actuating the isolation valve for that pair 21-26. Before proceeding to isolate the pair 21-26, the control device is first of all configured so that it controls just 10 of the 12 adsorbers of the unit (the control device is pre-configured to be capable of controlling selectively either all 12 of the adsorbers of the unit, or 10, or 8, or 6 of the adsorbers of the unit). In all cases, the cycle will be adapted to suit the configuration adopted. As soon as the control device has been configured to control just 10 of the 12 adsorbers of the unit 100, the pair that is to be isolated is then fluidically isolated. This isolation is performed by manual operation of the isolation valve assigned to the pair concerned.

Figure 2:
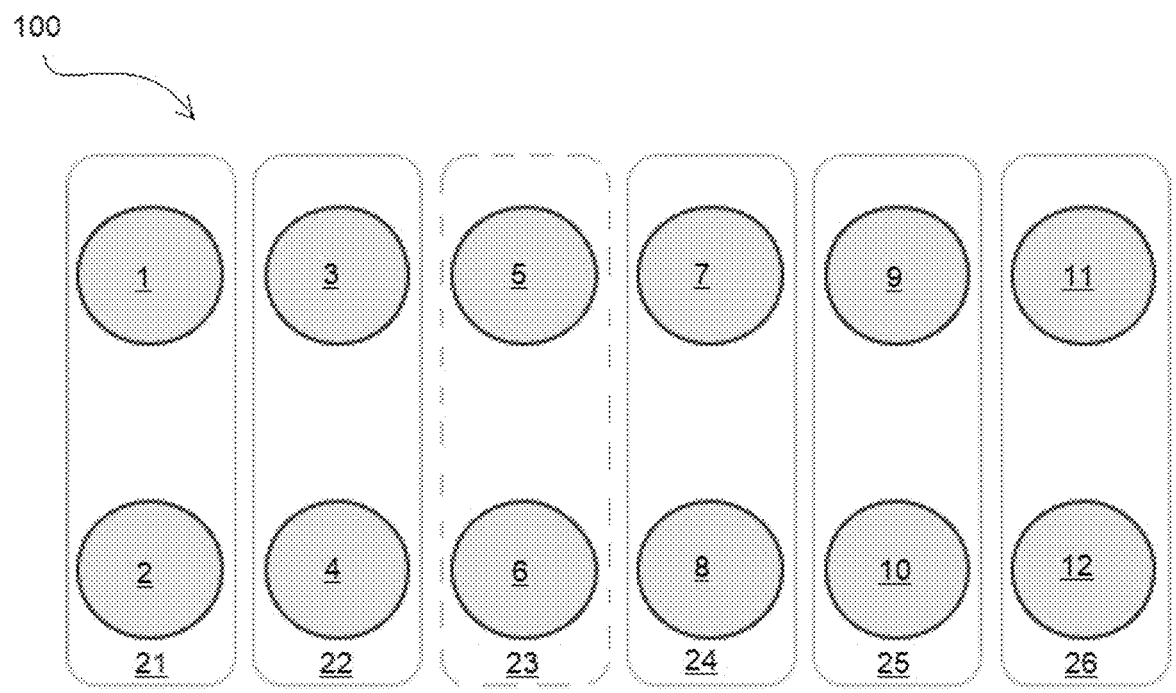
FIG. 2 is a schematic depiction of the PSA unit of FIG. 1, in which one pair is isolated.

FIG. 2 shows the unit 100 of FIG. 1, in which a first pair 23, comprising a first adsorber 5 and a second adsorber 6, has been fluidically isolated with respect to the other adsorbers of the unit 100.

The unit 100 then operates with just 10 adsorbers (those belonging to the pairs 21, 22, 24, 25 and 26).

Under these conditions of operation of the PSA unit 100, and when there is a desire to fluidically isolate a third adsorber 8 of the unit 100, the following method is implemented.

Figure 3:
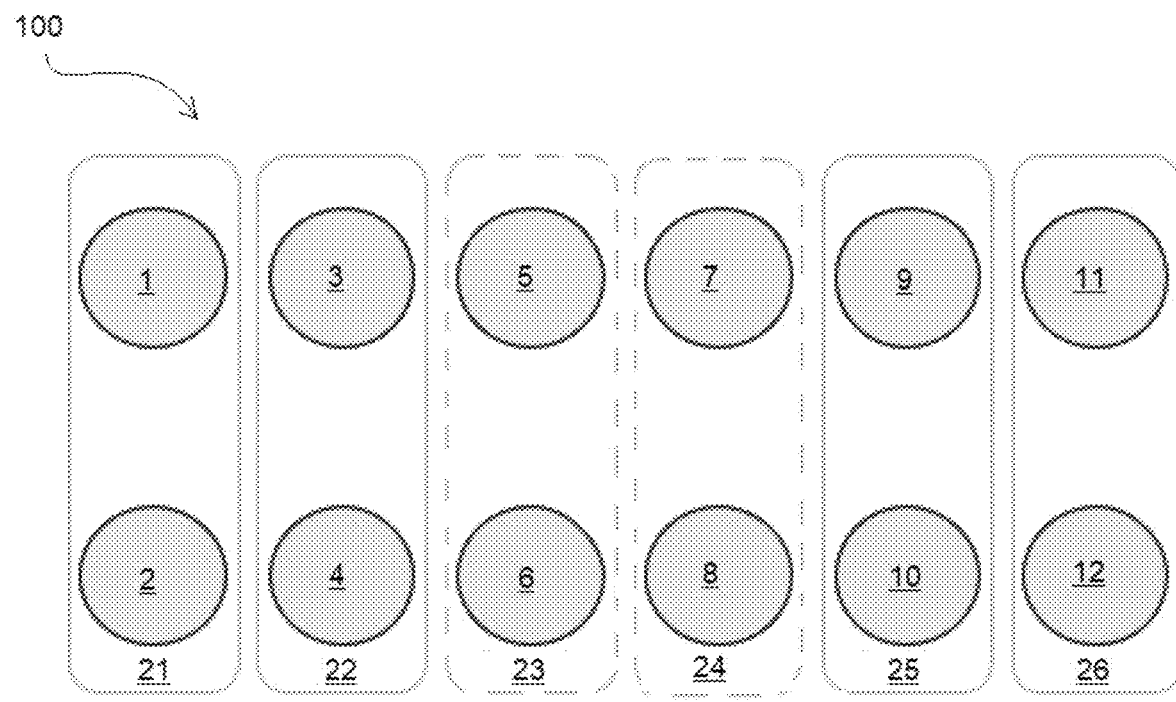
FIG. 3 is a schematic depiction of the PSA unit of FIG. 2, in which another pair is isolated.

With reference to FIG. 3, the starting point is to set the control device so that it controls just 8 adsorbers of the unit 100 (in the example of FIG. 3, the adsorbers of the pairs 21, 22, 25, 26).

Next, a second pair 24 is fluidically isolated from the unit 100. This pair 24 comprises the third adsorber 8 and a fourth adsorber 7.

Working on the assumption that the second adsorber 6 and the third adsorber 8 are defective and that the first adsorber 5 and the fourth adsorber 7 are functional, the method will allow the first 5 and fourth 7 adsorbers to be brought back into operation in order to improve the output of the unit 100.

The second 6 and third 8 adsorbers are fluidically isolated from the other adsorbers of the unit 100. This operation is achieved by fitting ring seals that act as hermetic plugs so as to prevent any leak of gas from the unit 100, while at the same time allowing these second 6 and third 8 adsorbers to be isolated. This isolation now being independent of the isolation of the pair to which they belong.

The cycle valves that control these second 6 and third 8 adsorbers can be removed.

The second 6 and third 8 adsorbers are then purged and inerted so as to allow maintenance operations without the risks associated with the presence of dangerous gases.

Figure 4:
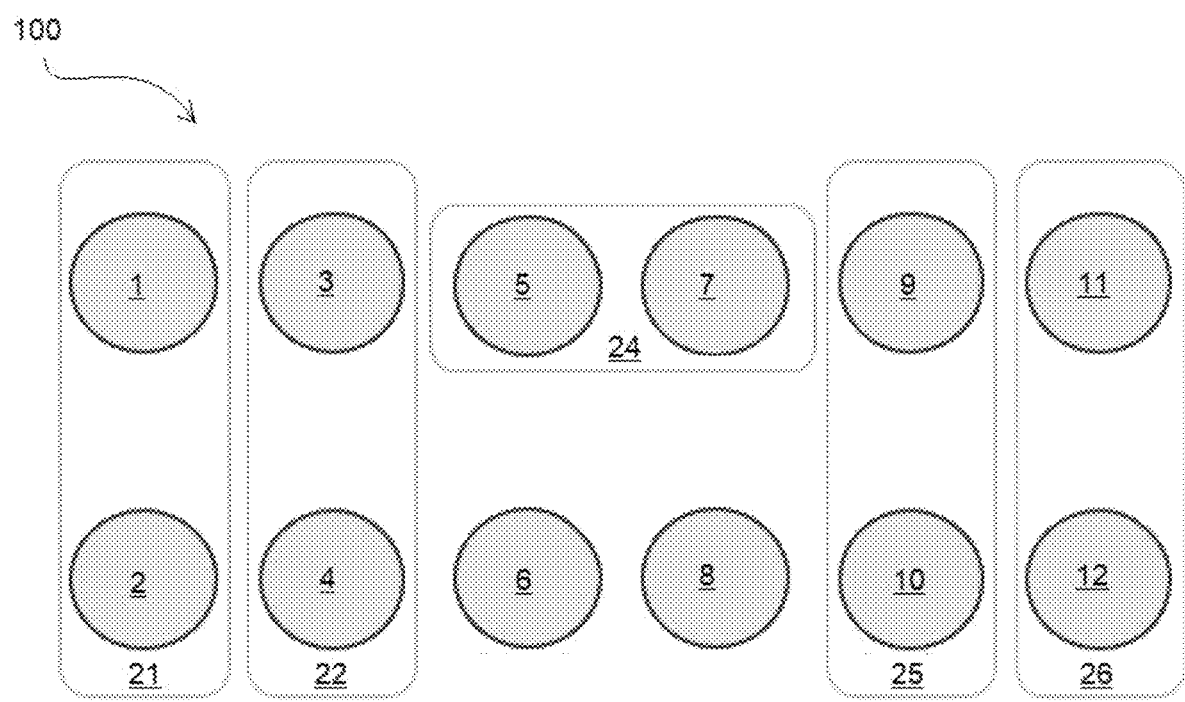
FIG. 4 is a schematic depiction of the PSA unit of FIG. 3, implementing the method according to the invention.

With reference to FIG. 4, the unit 100 is configured in such a way as to allow the first 5 and fourth 7 adsorbers to be brought back into operation within the unit 100.

That end (or connector) of the electric cables that is connected to the instrumentation means of the first adsorber 5 is changed over with that end of the electric cables that is connected to the third adsorber 8.

Thus, the control device, when seeking to control the third adsorber 8 will in fact be controlling the first adsorber 5.

Via this switching-over of the electric cables, the control device will be able to manage the first 5 and fourth 7 adsorbers as if they belonged to the second pair 24.

The method next comprises the step of placing the first 23 and second 24 pairs in fluidic communication with respect to the unit, by opening the respective isolation valves. Note that because of the hermetic plugs, the second 6 and third 8 adsorbers remain fluidically isolated with respect to the other adsorbers of the unit 100.

The method next comprises the step of setting the control device to control just 10 adsorbers of the unit (the second 6 and third 8 adsorbers not being used).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for managing a pressure swing adsorption gas treatment unit, the unit comprising:
   at least N adsorbers, N being an even number greater than or equal to 6, the N adsorbers being arranged in pairs,
   a plurality of isolation valves for selectively isolating at least one pair with respect to the unit,
   a plurality of cycle valves for controlling the pressure cycle of each adsorber,
   each pair being arranged in such a way as to be isolated selectively, so that isolating a pair allows the two adsorbers of the pair to be fluidically isolated with respect to the unit, the isolating of a pair being performed by closing at least one isolation valve,
   a control device,
   a plurality of interfaces for accessing instrumentation means of each adsorber,
   wherein, when a first pair is fluidically isolated with respect to the unit by the closing of at least one isolation valve, the first pair comprising a first adsorber and a second adsorber, and the control device being configured to control only N-2 adsorbers of the unit,
   isolating of a third adsorber comprises the steps of:
   setting the control device to control only N-4 adsorbers of the unit,
   fluidically isolating a second pair with respect to the unit by closing at least one isolation valve, the second pair comprising the third adsorber and a fourth adsorber,
   fluidically isolating one of the first and second adsorbers so that it is isolated from the unit independently of the fluidic isolation of the pair to which it belongs,
   fluidically isolating the third adsorber so that it is isolated from the unit independently of the fluidic isolation of the pair to which it belongs,
   while the first and second pairs are fluidically isolated from the unit, configuring the interfaces so as to swap over the instrumentation means of the other of the first and second adsorbers and the instrumentation means of the third adsorber,
   placing the first and second pairs in fluidic communication with respect to the unit by opening at least one isolation valve,
   setting the control device to control only N-2 adsorbers of the unit.

2. The method according to claim 1, further comprising the step of removing or deactivating a plurality of the cycle valves.

3. The method according to claim 1, further comprising the step of purging one of the first and second adsorbers and the third adsorber.

4. The method according to claim 3, further comprising the step of inerting one of the first and second adsorbers and the third adsorber.

5. The method according to claim 1, wherein the interfaces comprises cables connecting the instrumentation means of each adsorber to the control device, the method comprising the step of changing over the end of the cables that is connected to the instrumentation means of the other of the first and second adsorbers with the end of the cables that is connected to the instrumentation means of the third adsorber.

* * * * *